(12) United States Patent  
Tooyama

(10) Patent No.: US 11,697,210 B2  
(45) Date of Patent: Jul. 11, 2023

(54) ROBOT SYSTEM

(71) Applicant: FANUC CORPORATION, Yamanashi (JP)

(72) Inventor: Wataru Tooyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 423 days.

(21) Appl. No.: 16/889,180

(22) Filed: Jun. 1, 2020

(65) Prior Publication Data

US 2020/0391388 A1 Dec. 17, 2020

(30) Foreign Application Priority Data

Jun. 11, 2019 (JP) ................. 2019-109031

(51) Int. Cl.  
*B25J 9/16* (2006.01)

(52) U.S. Cl.  
CPC ................. *B25J 9/1697* (2013.01)

(58) Field of Classification Search  
CPC .............. B25J 9/1697; B25J 9/0093  
See application file for complete search history.

(56) References Cited

U.S. PATENT DOCUMENTS

| | | | |
|---|---|---|---|
| 9,289,897 B2 * | 3/2016 | Mattern | B25J 19/023 |
| 10,407,250 B2 * | 9/2019 | Iwai | B25J 9/1697 |
| 10,569,414 B2 * | 2/2020 | Nakashima | B25J 9/0093 |
| 10,792,706 B2 * | 10/2020 | Wagner | B65B 35/06 |
| 11,084,173 B2 * | 8/2021 | Katagiri | B65G 47/905 |
| 2006/0104788 A1 * | 5/2006 | Ban | G06T 1/0014 |
| | | | 414/729 |
| 2012/0323358 A1 * | 12/2012 | Izumi | G06V 10/26 |
| | | | 901/50 |
| 2019/0070734 A1 * | 3/2019 | Wertenberger | B25J 15/0616 |
| 2020/0095001 A1 * | 3/2020 | Menon | B25J 9/1687 |

FOREIGN PATENT DOCUMENTS

JP 2004-001122 A 1/2004

* cited by examiner

*Primary Examiner* — Nicholas Kiswanto  
(74) *Attorney, Agent, or Firm* — Studebaker & Brackett PC

(57) ABSTRACT

Provided is a robot system that that can efficiently take out stacked workpieces being conveyed at low cost. A robot system includes: a position acquiring unit that acquires positions of workpieces on a basis of the workpieces captured by a first imaging unit; a three-dimensional information acquiring unit that acquires three-dimensional information of the workpieces of which positions are acquired, on a basis of the workpieces captured by a second imaging unit; a determination unit that determines whether another workpiece is hidden by an exposed workpiece among the workplaces, on a basis of the three-dimensional information of the workpieces; a take-out unit that takes out the exposed workpiece; a detection unit that, in a case in which it is determined that the other workpiece is hidden by the exposed workpiece, detects the other workpiece by causing the second imaging unit to image the other workpiece after the other workpiece is exposed; and a transmission unit, that transmits a detection result by the detection unit to outside of the detection unit for use in a take-out operation by a robot.

6 Claims, 5 Drawing Sheets

ROBOT SYSTEM

This application is based on and claims the benefit of priority from Japanese Patent Application No. 2019-109031, filed on 11 Jun. 2019, the content of which is incorporated herein by reference.

BACKGROUND OF THE INVENTION

Field of the Invention

The present invention relates to a robot system.

Related Art

Visual tracking in a robotic system refers to an application in which the system finds a large number of objects flowing on a conveyor as a conveying unit with a camera, and a robot takes out the objects in accordance with the flow of the conveyor. Thus, it is possible for a plurality of robots to take out the objects flowing on the conveyor in a shared manner.

As an apparatus using visual tracking, a picking device is known which recognizes the position and posture of a workpiece in the detection operation at the initial stage using a first stereo camera, repeatedly actuates a second stereo camera while moving the hand of the robot by following the moving position of the workpiece, calculates the displacement amount of the position and posture of the workpiece, followed by correcting the displacement amount, thereby controlling the target position of the final picking operation and the hand posture (e.g., refer to Unexamined Patent Application, Publication No. 2004-1122).

Patent Document 1: Japanese Unexamined Patent Application, Publication No. 2004-1122

SUMMARY OF THE INVENTION

However, the picking device disclosed in Unexamined Patent Application, Publication No. 2004-1122 is not a device for a case in which workpieces are stacked.

When using visual tracking, if the workpieces flowing on the conveyor are stacked up, the workpieces hidden under a workpiece located above are not detected because they cannot be measured even when the image is taken, and thus, they will be missed. As a solution to this problem, a method of making a workpiece orbit by an arc conveyor, a method of providing a return mechanism, or a method of performing multiple imaging and measurement by a single fixed camera are conceivable. However, the installation of such a system is high cost.

It is desirable to provide a robot system that can efficiently take out stacked workpieces being conveyed at low cost.

According to an aspect of the present disclosure, a robot system includes: a first imaging unit that images workpieces that are conveyed by a conveying unit; a robot including a second imaging unit that images the workpieces that are conveyed by the conveying unit; a position acquiring unit that acquires positions of the workpieces on a basis of the workpieces captured by the first imaging unit; a three-dimensional information acquiring unit that acquires three-dimensional information of the workpieces of which positions are acquired by the position acquiring unit, on a basis of the workpieces captured by the second imaging unit; a determination unit that determines whether another workpiece is hidden by an exposed workpiece among the workpieces, on a basis of the three-dimensional information of the workpieces acquired by the three-dimensional information acquiring unit; a take-out unit that takes out the exposed workpiece; a detection unit that, in a case in which it is determined that the other workpiece is hidden by the exposed workpiece, detects the other workpiece by causing the second imaging unit to image the other workpiece after the other workpiece is exposed; and a transmission unit, that transmits a detection result by the detection unit to outside of the detection unit for use in a take-out operation by the robot.

According to an aspect, it is possible to provide a robot system that can efficiently take out stacked workpieces being conveyed at low cost.

BRIEF DESCRIPTION OF TEE DRAWINGS

DETAILED DESCRIPTION OF THE INVENTION

Hereinafter, a description will be given of the embodiment of the present invention with reference to FIGS. 1 to 8.

<1 Structure of Embodiment>

Figure 1:
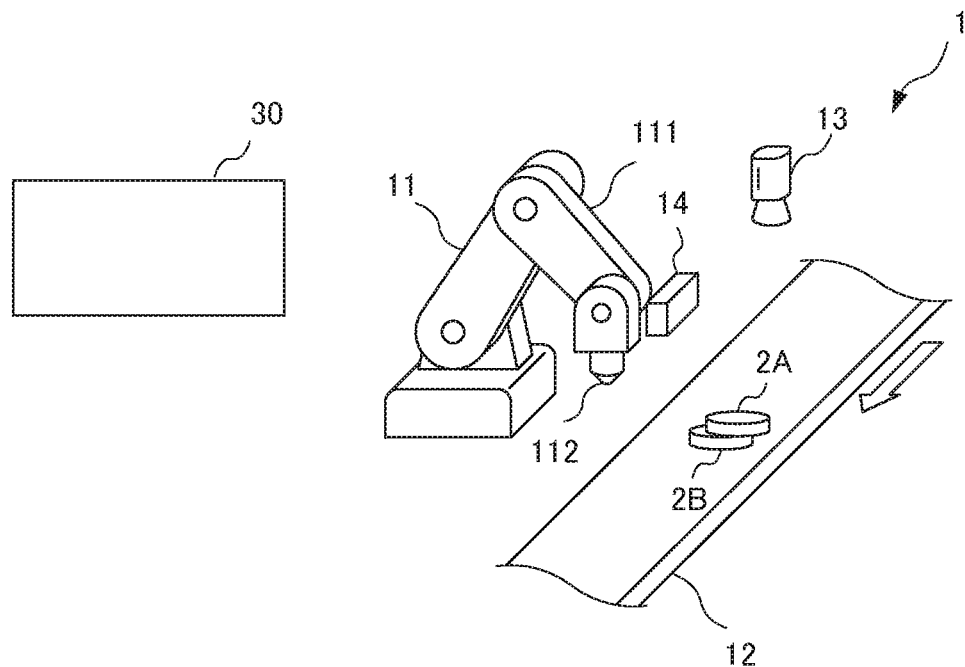
FIG. 1 is an overall configuration diagram of an embodiment.

FIG. 1 is a diagram showing the overall configuration of a robot system 1 according to an embodiment of the present invention. As shown in FIG. 1, the robot system 1 according to the embodiment includes a robot 11, a conveyor (hereinafter, also referred to as "conveying unit") 12, a fixed camera (hereinafter, also referred to as "first imaging unit") 13, a 3D vision sensor (hereinafter, also referred to as "second imaging unit") 14, and a control unit 30.

Furthermore, workpieces 2 including, for example, a workpiece 2A and a workpiece 2E, flow on the conveyor 12 with the workpiece 2A stacked on the workpiece 2B.

The robot 11 has a plurality of drive axes to position the tip portion. The robot 11 is typically a vertically articulated type robot as shown. However, the robot 11 may be, for example, a rectangular coordinate robot, a scalar robot, a parallel link robot, or the like.

In particular, in the present embodiment, the robot 11 is a robot for picking the workpiece 2 flowing from upstream on the conveyor 12. The robot 11 includes an arm 111 and a hand 112 (hereinafter, also referred to as "take-out unit"). The hand 112 is provided at the tip portion of the arm 111. The robot 11 brings the hand 112 close to the workpiece 2 as a target by driving the arm 111, and picks the workpiece 2 by the hand 112.

The conveyor 12 is a device for conveying the workpiece 2 from upstream from the robot 11 toward downstream from the robot 11. The conveyor 12 may be, for example, a belt conveyor.

The fixed camera 13 is a device for imaging the workpiece 2 flowing on the conveyor 12 further on the upstream side than the robot 11. It is preferable for the relative position of the fixed camera 13 to the conveyor 12 to be fixed. However, the present invention is not limited thereto. Furthermore, the fixed camera 13 is a camera for imaging a two-dimensional image of the workpiece 2 in particular, and is generally less expensive than the 3D vision sensor 14 described later. However, the present invention is not limited thereto.

In particular, in the present embodiment, the fixed camera 13 is used to acquire the rough position of the workpiece 2 on the conveyor 12. Furthermore, it is also possible for the fixed camera 13 to have typical functions.

The 3D vision sensor 14 is a sensor that can image a three-dimensional image of an object. In particular, in the present embodiment, the 3D vision sensor 14 is fixed to the arm 111 of the robot 11. With such a configuration, before and after the robot 11 picking the workpiece 2 by the hand 112, the 3D vision sensor 14 can acquire the three-dimensional information of the workpiece 2 by approaching the workpiece 2. However, the present invention is not limited thereto, and the 3D vision sensor 14 can be installed at any position as long as the position allows the 3D vision sensor to image the three-dimensional image of the workpiece 2.

The control unit 30 is configured by a microprocessor (not shown) including a CPU and memory. In the control unit 30, the CPU of the microprocessor executes various kinds of control according to the robot system 1 in accordance with predetermined programs read out from the memory. Hereinafter, a description will be given of a part of the functions of the control unit 30.

Figure 2:
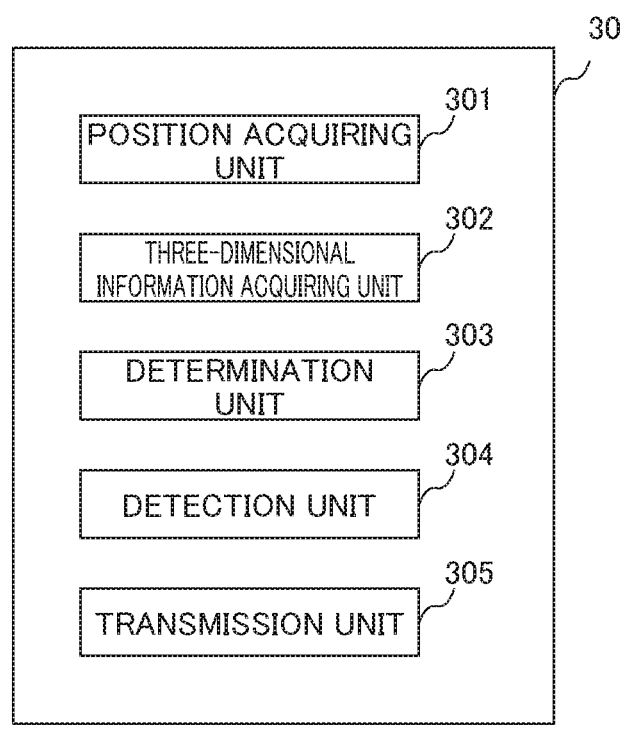
FIG. 2 is a functional block diagram of a control unit in an embodiment.

FIG. 2 is a functional block of the control unit 30. The control unit 30 includes a position acquiring unit 301, a three-dimensional information acquiring unit 302, a determination unit 303, a detection unit 304, and a transmission unit 305.

The position acquiring unit 301 acquires a rough position of the workpiece 2 on the conveyor 12 on the basis of a captured image of the workpiece 2 captured by the fixed camera 13.

The three-dimensional information acquiring unit 302 acquires the three-dimensional information of the workpiece 2 of which position is acquired by the position acquiring unit 301 on the basis of the captured image of the workpiece 2 captured by the 3D vision sensor 14. Here, the three-dimensional information includes, among other things, position information, posture information, and height information of the workpiece 2. In particular, in the present embodiment, when the hand 112 approaches the workpiece 2 of which the position is acquired by the position acquiring unit 301 by the arm 111 being driven, the three-dimensional information acquiring unit 302 acquires the three-dimensional information of the workpiece 2 by the 3D vision sensor 14 installed on the arm 111.

The determination unit 303 determines whether the workpiece 2B is hidden by the workpiece 2A exposed when viewed from the fixed camera 13, for example, in the workpiece 2 on the basis of the three-dimensional information of the workpiece 2 acquired by the three-dimensional information acquiring unit 302.

In particular, in the present embodiment, in a case in which the height in the height information included in the three-dimensional information of the workpiece 2 acquired by the three-dimensional information acquiring unit 302 is higher than the thickness of each of the workpieces 2A and 2B, it is possible to determine that the workpiece 2B is hidden by the exposed workpiece 2A. It should be noted that the position where the workpiece 2B is hidden is not limited to the position below the exposed workpiece 2A, and furthermore, the workpiece 2B may not be completely hidden.

Alternatively, the determination unit 303 may compare the ratio of the area occupied by the workpiece 2B in the image of the workpiece 2 with a predetermined threshold value in the three-dimensional image captured by the 3D vision sensor 14, and may determine whether the workpiece 2B is hidden by the exposed workpiece 2A in accordance with the comparison result.

Furthermore, the applicant has thus far filed applications relating to the technology for recognizing and detecting the relative position and posture of a plurality of workpieces when the workpieces are stacked, for example, in Japanese Patent Application No. 2009-28968 (Japanese Unexamined Patent Application, Publication. No. 2010-184308), Japanese Patent Application No. 2012-188485 (Japanese Unexamined Patent Application, Publication No. 2014-046371), and Japanese Patent Application No. 2017-29853 (Japanese Unexamined Patent Application, Publication No. 2018-134698). By adopting these technologies in the present invention, it is possible to determine whether the workpiece 2B is hidden by the exposed workpiece 2A.

For example, technology may be adopted in the present invention in which any two workpieces from a plurality of workpieces, and an overlapping area in which the two workpieces overlap with each other is estimated on the basis of the position and posture of each workpiece and the dimensional information of the workpieces, and in a case in which a specific shape of either workpiece of the two workpieces is included in this overlapping area, the gradient information for the individual pixels of the image of the overlapping portion is calculated, and either workpiece of the two workpieces is positioned on the other workpiece on the basis of the gradient information.

Alternatively, technology may be adopted in the present invention in which the surface position of a plurality of articles loaded in bulk in a three-dimensional space is measured, the position information of a plurality of three-dimensional points is acquired, a set of connections formed by connecting the three-dimensional points in the vicinity of each other from among the acquired plurality of three-dimensional points is calculated, and the position and the posture of an article is specified on the basis of the positional information of the three-dimensional points belonging to the set of connections.

Alternatively, technology may be adopted in the present invention in which three-dimensional points in which each point has height position information are obtained as the three-dimensional information of the workpiece in the container, a plurality of sets of the three-dimensional points in which the adjacent points satisfy a predetermined condition is created among the three-dimensional point groups, a set falling within at least one of the reference of a predetermined size, the reference of a predetermined area, and the reference of a predetermined length is specified as a set of exclusions among the plurality of sets of three-dimensional points, a three-dimensional point group for workpiece detection acquired by excluding the points included in the set of exclusions from the three-dimensional point group for workpiece detection or the plurality of sets of three-dimensional points, and the workpiece detection for taking out by the robot is performed from the three-dimensional point for workpiece detection.

In a case in which the determination unit 303 determines that the workpiece 2B is hidden by the exposed workpiece 2A, the detection unit 304 detects the workpiece 2B with the 3D vision sensor 14 after the exposed workpiece 2A is taken out by the hand 112 to expose the workpiece 2B.

In particular, in the present embodiment, it is possible to detect the workpiece 2B by causing the 3D vision sensor 14 to image the workpiece 2B during the "retraction operation" after the exposed workpiece 2A is taken out by the hand 112, i.e., during the operation of the hand 112 conveying the workpiece 2A to another location after holding the workpiece 2A.

The transmission unit 305 transmits a detection result by the detection unit 304 to the outside of the detection unit 304 for use in the take-out operation by the robot 11.

In particular, in the present embodiment, it is possible for the transmission unit 305 to transmit the detection result by the detection unit 304 to the control unit of the robot 11A for use in the take-out operation by the robot 11A in the next process.

<2 Operation of Embodiment>

Figure 3:
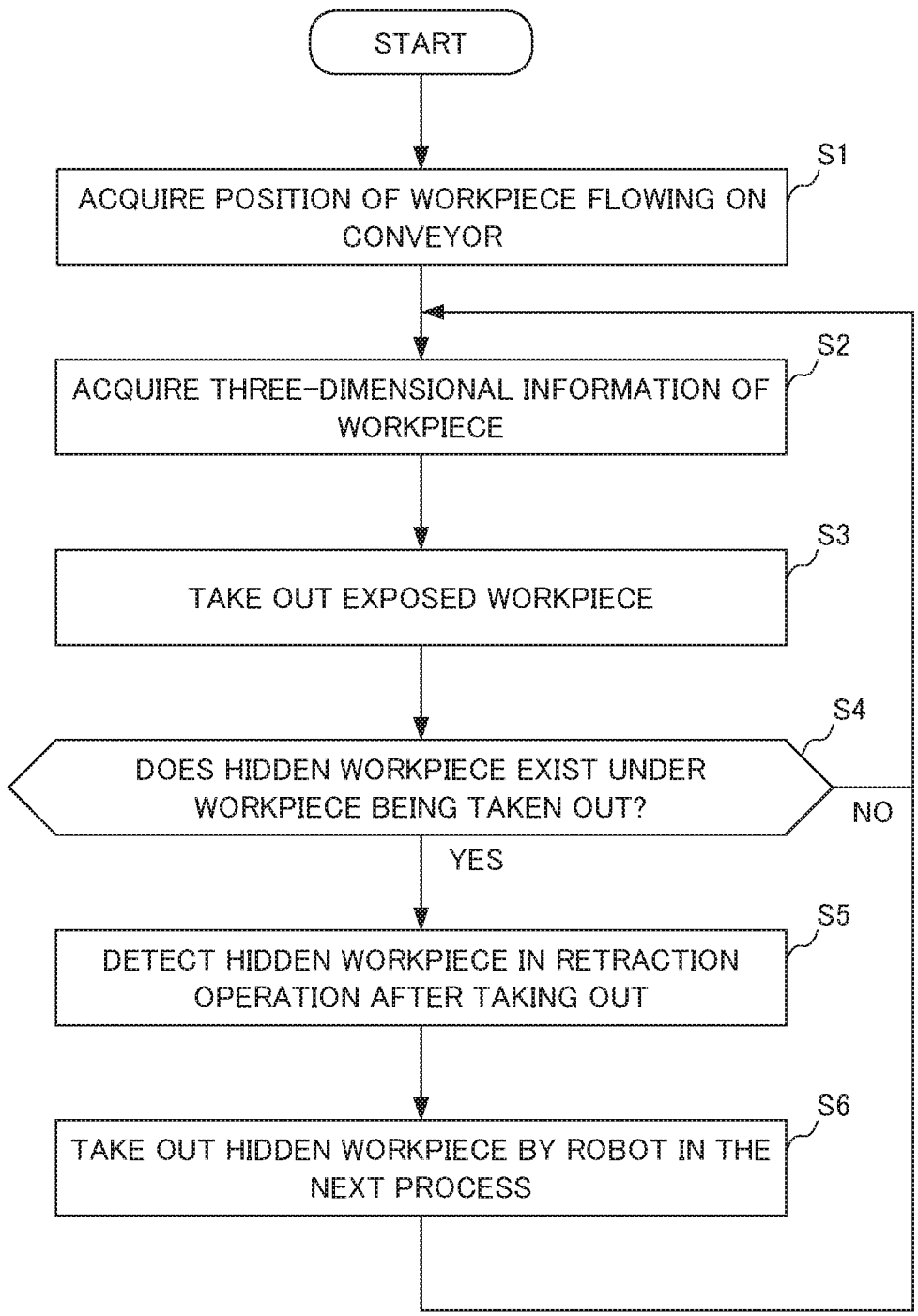
FIG. 3 is a flowchart showing operation of an embodiment.

FIG. 3 is a flowchart showing operation of the robot system 1 according to the present embodiment. Furthermore, FIGS. 4 to 8 are views showing positional relationships and states of the respective components in the robot system 1 in each step of the flowchart shown in FIG. 3. Hereinafter, operation of the robot system 1 will be described with reference to FIGS. 3 to 8.

Figure 4:
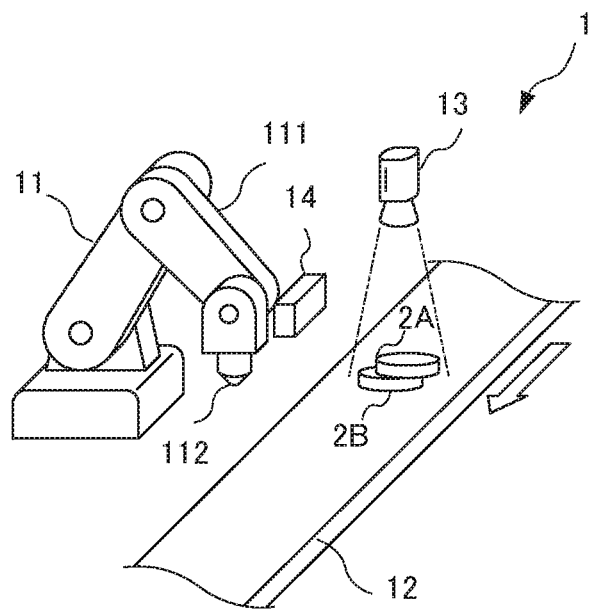
FIG. 4 is a diagram showing the positional relationship of each component during operation of an embodiment.

In Step S1, as shown in FIG. 4, the position acquiring unit 301 acquires the rough position of the workpiece 2 on the conveyor 12 on the basis of a captured image captured by the fixed camera 13, of the workpiece 2 (2A, 2B) flowing on the conveyor 12.

Figure 5:
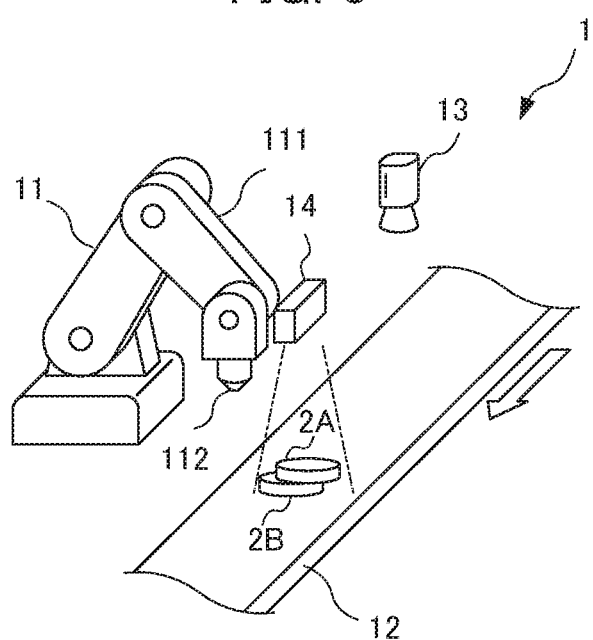
FIG. 5 is a diagram showing the positional relationship of each component during operation of an embodiment.

In Step S2, as shown in FIG. 5, the three-dimensional information acquiring unit 302 acquires the three-dimensional information of the workpiece 2 of which the position is acquired by the position acquiring unit 301 on the basis of the captured image of the workpiece 2 captured by the 3D vision sensor 14.

Figure 6:
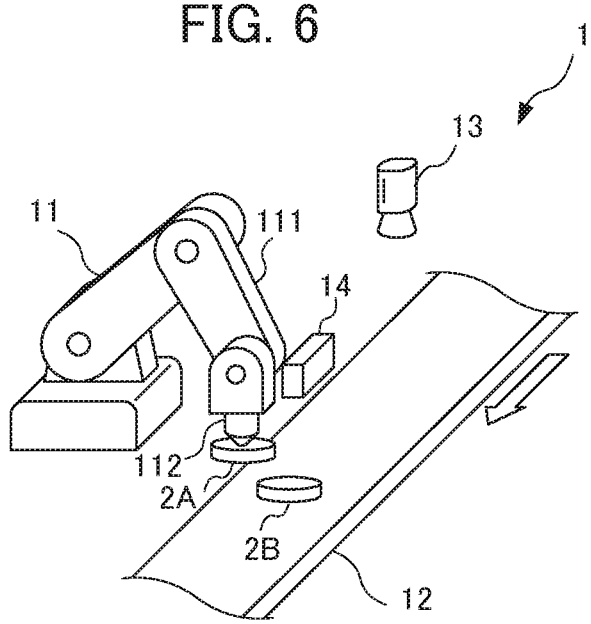
FIG. 6 is a diagram showing the positional relationship of each component during operation of an embodiment.

In Step S3, as shown in FIG. 6, the hand 112 takes out the exposed workpiece 2A.

In Step S4, in a case in which the hidden workpiece 2B exists when the workpiece 2A is taken out (S4: Yes), the processing advances to Step S5. In a case in which there is no hidden workpiece 2B when the workpiece 2A is taken out (S4: NO), the processing returns to Step S2.

Figure 7:
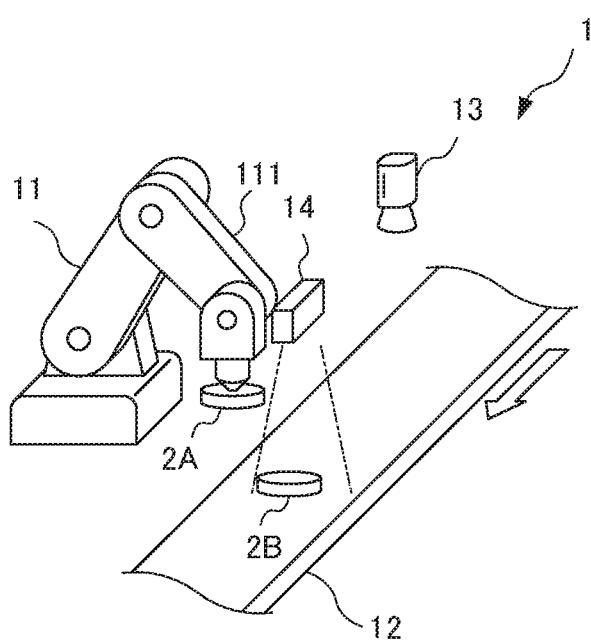
FIG. 7 is a diagram showing the positional relationship of each component during operation of an embodiment.

In Step S5, as shown in FIG. 7, during the retraction operation after taking out of the workpiece 2A, the detection unit 304 detects the workpiece 2B which has been hidden.

Figure 8:
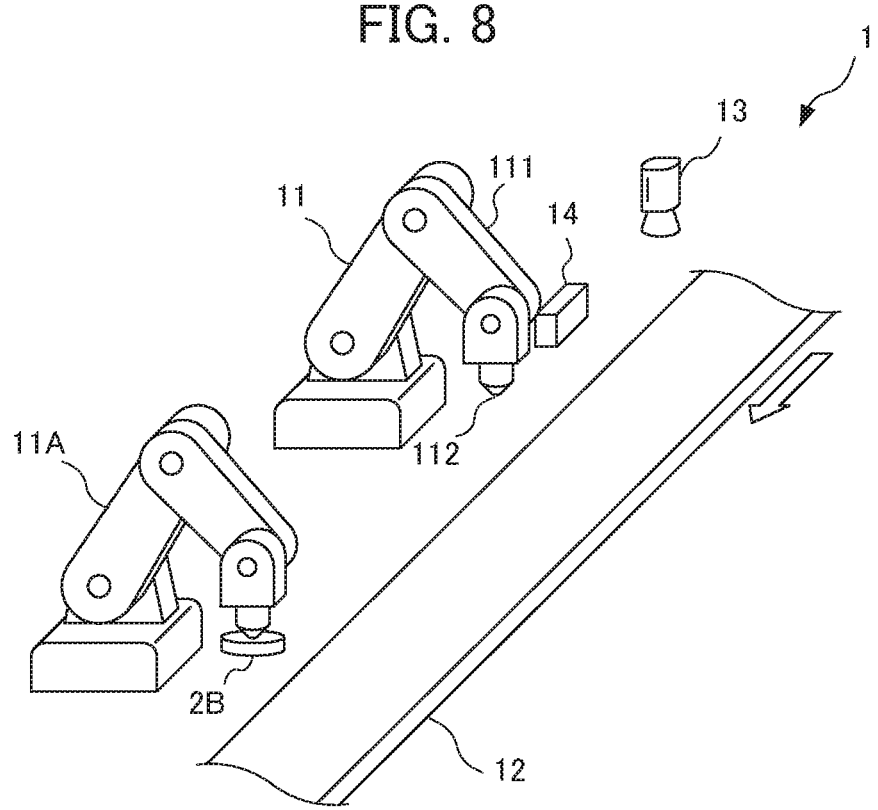
FIG. 8 is a diagram showing the positional relationship of each component during operation of an embodiment.

In Step S6, as shown in FIG. 8, the transmission unit 305 transmits the detection result of the hidden workpiece 2B by the detection unit 304 to the control unit of the robot 11A in the next process. With such a configuration, the robot 11A in the next process takes out the workpiece 2B which has been hidden. Thereafter, the processing returns to Step S2.

<3 Effect of Embodiment>

The robot system 1 according to the present embodiment includes: the fixed camera 13 that images the workpieces 2 that are conveyed on the conveyor 12; the robot 11 including the 3D vision sensor 14 that images the workpieces 2 that are conveyed by the conveyor 12; the position acquiring unit 301 that acquires positions of the workpieces 2 on the basis of the workpieces 2 captured by the fixed camera 13; the three-dimensional information acquiring unit 302 that acquires three-dimensional information of the workpieces 2 of which positions are acquired by the position acquiring unit 301, on the basis of the workpieces 2 captured by the 3D vision sensor 14; the determination unit 303 that determines whether another workpiece 2B is hidden by the exposed workpiece 2A among the workpieces 2, on the basis of the three-dimensional information of the workpieces 2 acquired by the three-dimensional information acquiring unit 302; the hand 112 that takes out the exposed workpiece 2A; a detection unit 304 that, in a case in which it is determined that the other workpiece 2B is hidden by the exposed workpiece 2A, detects, the other workpiece 2B by causing the 3D vision sensor 14 to image the other workpiece 2B after the other workpiece 2B is exposed; and the transmission unit 305 that transmits a detection result by the detection unit 304 to outside of the detection unit 304 for use in a take-out operation by the robot 11.

With such a configuration, it is possible to efficiently take out a workpiece 2 stacked on the conveyor 12. Furthermore, since it is unnecessary to prepare another mechanism such as an arc conveyor, it is possible to reduce the cost.

Furthermore, in the robot system 1 according to the present embodiment, the transmission unit 305 may transmit the detection result to the control unit of the robot 11A for use in the take-out operation by the robot 11A in the next process.

With such a configuration, it is possible to reduce failure in taking out the workpiece 2 in the robot system 1.

Furthermore, in the robot system 1 according to the present embodiment, the fixed camera 13 may acquire a two-dimensional image of the workpiece 2, and the relative position of the fixed camera 13 to the conveyor 12 may be fixed.

With such a configuration, it is possible to acquire a rough position of the workpiece 2 on the conveyor 12 by using a relatively inexpensive fixed camera 13.

Furthermore, in the robot system 1 according to the present embodiment, the 3D vision sensor 14 may be attached to the arm 111 of the robot 11.

With such a configuration, it is possible to detect the workpiece 2B which has been hidden by the 3D vision sensor 14 during the retraction operation.

Furthermore, in the robot system 1 according to the present embodiment, the three-dimensional information described above may include the height information, the position information, and the posture information of the workpiece 2.

With such a configuration, by comparing the height of the workpiece 2 with the thickness of the workpiece 2, it is possible to determine whether stacking of the workpieces 2 is occurring.

EXPLANATION OF REFERENCE NUMERALS 1 robot system
2, 2a, 2b workpiece
11 robot
12 conveyor
13 fixed camera (first imaging unit)
14 3D vision sensor (second imaging unit)
30 control unit
111 arm
112 hand (take-out unit)
301 position acquiring unit. (position acquiring unit)
302 three-dimensional information acquiring unit (three-dimensional information acquiring unit)
303 determination unit (determination unit)
304 detection unit (detection unit)
305 transmission unit (transmission unit)

What is claimed is:

1. A robot system comprising:
a camera that images workpieces that are conveyed by a conveyor;
a robot including a vision sensor that images the workpieces that are conveyed by the conveyor; and
a processor configured to:
acquire positions of the workpieces on a basis of the workpieces captured by the camera;
acquire three-dimensional information of the workpieces of which positions are acquired by the processor, on a basis of the workpieces captured by the vision sensor;
determine whether another workpiece is hidden by an exposed workpiece among the workpieces, on a basis of the three-dimensional information of the workpieces acquired by the processor;
cause the robot to take out the exposed workpiece;
detect, in a case in which it is determined that the other workpiece is hidden by the exposed workpiece, the other workpiece by causing the vision sensor to image the other workpiece after the other workpiece is exposed; and
transmit a detection result by the processor for use in a take-out operation by the robot.

2. The robot system according to claim 1, wherein the processor is configured to transmit the detection result for use in a take-out operation by a robot in a next process.

3. The robot system according to claim 1, wherein the camera acquires a two-dimensional image of the workpieces, and a relative position in relation to the conveyor is fixed.

4. The robot system according to claim 1, wherein the vision sensor is attached to an arm of the robot.

5. The robot system according to claim 1, wherein the three-dimensional information includes height information, position information, and posture information of the workpiece.

6. The robot system according to claim 1, wherein the robot takes out the exposed workpiece to thereby entirely expose a surface of the other workpiece facing the vision sensor.

* * * * *